United States Patent
Hayes et al.

(10) Patent No.: US 8,431,027 B2
(45) Date of Patent: Apr. 30, 2013

(54) DISSOLVED AIR FLOTATION SYSTEM WITH BUBBLE SEPARATION SYSTEM AND METHOD OF USE

(75) Inventors: Mark J. Hayes, Maple Lake, MN (US); Joey M. Anderson, Los Angeles, CA (US)

(73) Assignee: Sionix Corporation, Los Angeles, CA (US)

( * ) Notice: Subject to any disclaimer, the term of this patent is extended or adjusted under 35 U.S.C. 154(b) by 257 days.

(21) Appl. No.: 13/029,970

(22) Filed: Feb. 17, 2011

(65) Prior Publication Data

US 2012/0211431 A1    Aug. 23, 2012

(51) Int. Cl.
*C02F 1/24* (2006.01)

(52) U.S. Cl.
USPC ........................................ 210/703; 210/221.2

(58) Field of Classification Search .................. 210/703, 210/221.2
See application file for complete search history.

(56) References Cited

U.S. PATENT DOCUMENTS

| | | | |
|---|---|---|---|
| 1,301,532 A | 4/1919 | Allen | |
| 2,519,606 A | 8/1950 | Sharp | |
| 2,994,432 A | 8/1961 | Schluter | |
| 3,313,795 A | 4/1967 | Rubin | |
| 3,679,056 A | * 7/1972 | Haymore | 210/221.2 |
| 4,100,066 A | 7/1978 | Bloomer et al. | |
| 4,257,891 A | 3/1981 | Albohn | |
| 4,563,274 A | 1/1986 | Rothon et al. | |
| 4,564,457 A | 1/1986 | Cairo et al. | |
| 5,080,802 A | 1/1992 | Cairo et al. | |
| 5,690,834 A | * 11/1997 | Bennoit et al. | 210/703 |
| 5,693,222 A | 12/1997 | Galvan et al. | |
| 2004/0168964 A1 | 9/2004 | Lambert et al. | |
| 2008/0149567 A1 | 6/2008 | Bolam | |

FOREIGN PATENT DOCUMENTS

| | | |
|---|---|---|
| CA | 2183146 | 2/1998 |
| JP | 53136360 | 11/1978 |

* cited by examiner

*Primary Examiner* — Thomas M Lithgow
(74) *Attorney, Agent, or Firm* — K. David Crockett, Esq.; Nicky Economy Syrengelas, Esq.; Crockett & Crockett, PC

(57) ABSTRACT

A dissolved air flotation system and method for purifying fresh water.

4 Claims, 4 Drawing Sheets

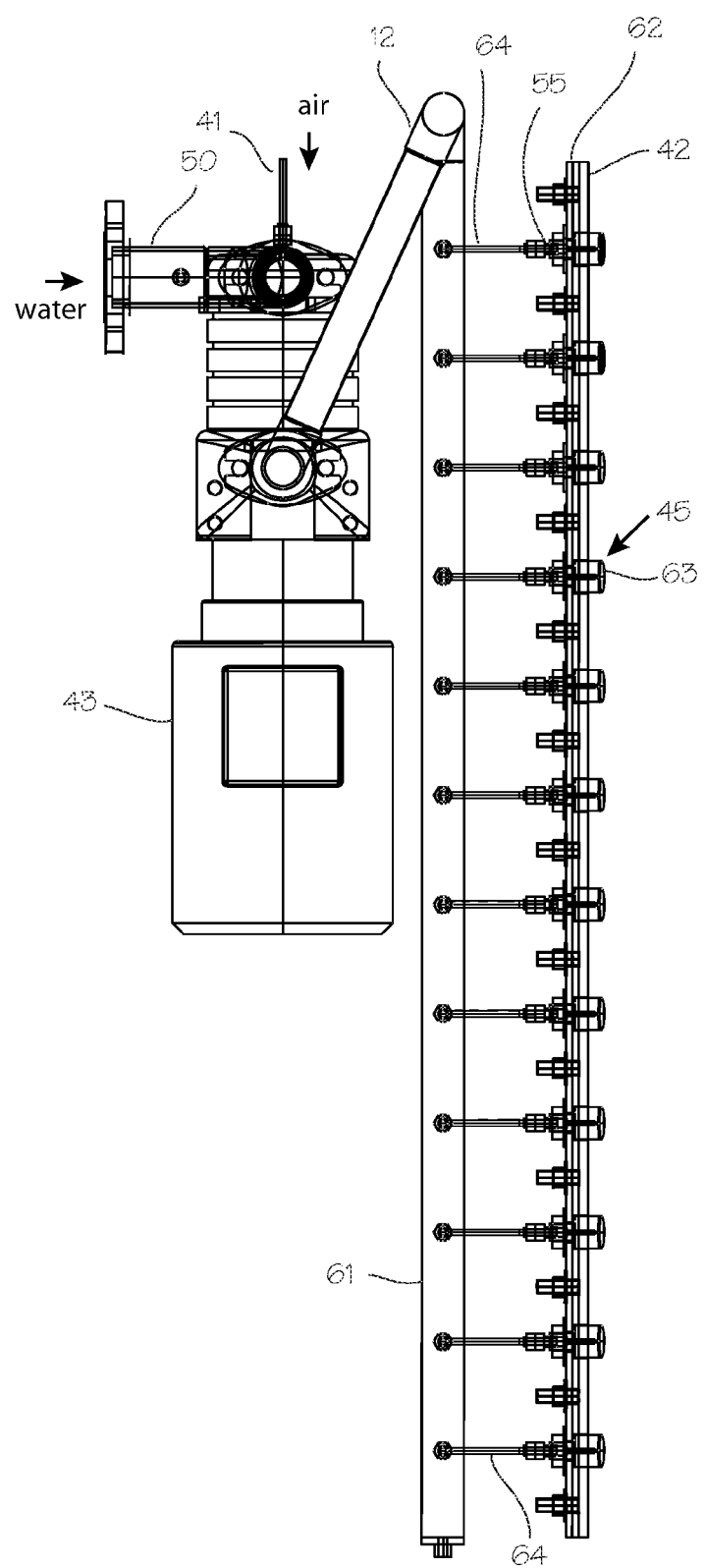

DISSOLVED AIR FLOTATION SYSTEM WITH BUBBLE SEPARATION SYSTEM AND METHOD OF USE

FIELD OF THE INVENTIONS

The inventions described below relate the field of dissolved air flotation.

BACKGROUND OF THE INVENTIONS

Dissolved air flotation is one of several processes used to clean and purify water. The process may be used for removing suspended solids, including organisms, from fresh water for municipal water supplies, or for removing suspended solids from industrial wastewater. In the dissolved air flotation process, influent water is mixed with a coagulant to form flocculent particles, and then white water (air-saturated high-pressure water) is injected into a tank of the influent water/flocculent mixture to form air bubbles that attach to the flocculent particles and lift them to the surface. In some processes, the coagulant may be omitted, and suspended solids can be lifted by the air bubbles. The particles lifted to the surface accumulate in a layer of scum or sludge, referred to as the float. This layer is skimmed off the surface of the tank, while clean water is drawn out of the bottom of the tank.

In our prior U.S. Pat. Nos. 6,921,478, 7,767,080, and 7,033,495, we disclosed a dissolved air flotation system comprising a flocculation tank with an output communicating downstream to a flotation tank, and white water injection system for injection finely aerated water into the flotation tank, a skimmer for pushing float over the downstream end wall of the flotation tank and a conveyor belt for carrying off the float after it has been skimmed, and a clean water outlet at the bottom of the flotation tank.

Experience with the device described in our prior patents has led to various improvements.

SUMMARY

The systems and methods described below provide for increased efficiency in the operation of a dissolved air flotation system.

The dissolved air flotation system described below includes a flotation tank, waste collecting system, filtering system, disinfecting system and control system arranged in a linear arrangement, with all the components sized and dimensioned to fit within a standard shipping container, as described in our prior patent. The waste collecting system includes a skimmer that moves across the surface of the water in the flotation tank and pushes the float onto a beach. The beach is provided in the form of a conveyor belt, which conveys skimmed float away from the tank and deposits it in a collecting tank. The skimmer is driven over the surface of the water occasionally to push the float onto the beach.

To enhance the effectiveness of the system, the white water injection system components are configured such that the influent water supply flows into a down-flow channel established between a first, vertical, zone baffle spaced from a wall at the upstream end of the tank and defining a bubble zone in the remainder of the flotation tank. The down-flow channel is sized and dimensioned to provide down-flow at a predetermined downward velocity when the influent water is provided at a predetermined volumetric rate. The white water supply system comprises a DAF pump, clean water supply line and air intake line in fluid communication with an inlet to the DAF pump, and a white water outlet line in fluid communication with an outlet of the DAF pump, and a number of injection nozzles, located low on the upstream wall of the tank, which direct white water into the down-flow channel. Influent water is supplied to the flotation tank such that it enters the down-flow channel at a predetermined volumetric rate such that the downward velocity of the influent water within down-flow channel is lower than the lift rate of large air bubbles. Consequently, large air bubbles which form in the down-flow channel after the white water is injected can rise in the inflow channel even while the influent water is flowing downwardly, and small air bubbles are carried downwardly, and then under the zone baffle and into the bubble zone of the flotation tank. The smaller bubbles are much more efficient in the DAF process, so the bubble separation enhances the efficiency of the process.

BRIEF DESCRIPTION OF THE DRAWINGS

FIG. 4 is a top view of dissolved air flotation system of FIG. 2.

DETAILED DESCRIPTION OF THE INVENTIONS

Figure 1:
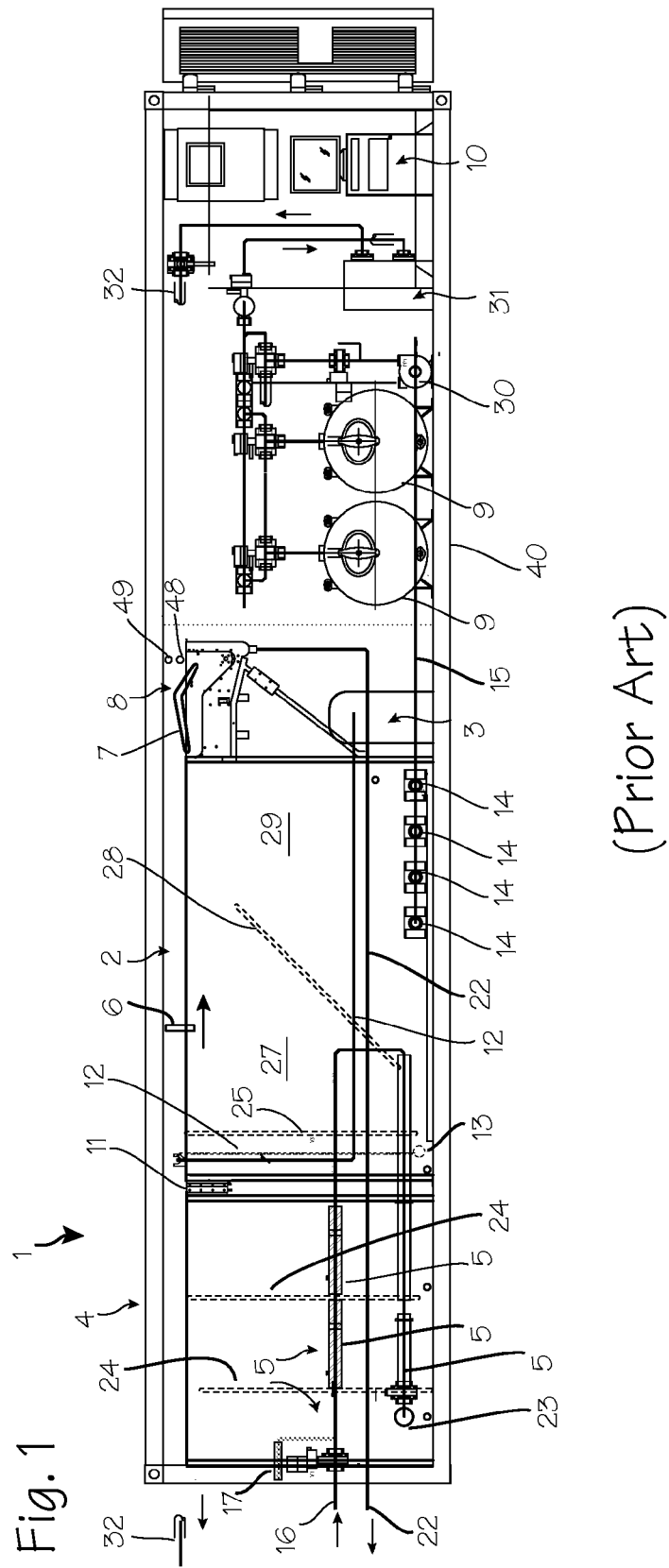
FIG. 1 illustrates the dissolved air flotation system.

FIG. 1 illustrates the dissolved air flotation system 1. The major components of the dissolved air flotation system include a flotation tank 2 and a dissolved air supply 3, a flocculation tank 4 and influent/coagulant mixing system 5, a skimmer assembly 6, a waste collecting system that includes a beach 7 and waste transport system 8, post-treatment filtration tanks 9, and a control room 10.

The flotation tank 1 is used to mix influent water with a stream of water containing a large amount of dissolved air. The bubbles produced from the dissolved air attach to flocculent (particles suspended in the water which have aggregated into clumps or masses in the flocculation tank) grown in the influent water and floats to the top of the tank where it collects in a thin layer referred to as float, sludge, or scum. For some applications, the flocculant and flocculation tank 4 may not be needed. The flotation tank is supplied with unpurified influent from the flocculation tank, flowing over weir 11 (as influent is pumped into the flocculation tank, the flocculation tank overflows into the flotation tank), and is supplied with high dissolved air content "white water" through supply line 12 which feeds a manifold 13 of injection ports located at the bottom of the flotation tank. Clean water is removed from the flotation tank through clean water outputs 14 (in fluid communication with output manifolds disposed transversely in the lower downstream portion of the flotation tank) and clean water output line 15. The flotation tank measures about 5 feet wide, 12 long, and 7 feet deep, and holds about 3000 gallons when full.

The flocculation tank 2 is used to combine coagulant molecules or particles with impurities in the influent water. The flocculation tank is supplied with influent fresh water which has been mixed with coagulant and, optionally, conditioning chemicals used to adjust water chemistry to enhance flocculation. Influent fresh water is injected into the flocculation tank through influent supply line 16 at the lower corner. The influent water thereafter flows through a tortuous pathway through the tank (the tortuous pathway is created by baffles disposed within the tank), until it overflows over the dam or weir 11 into the flotation tank, so as to provide adequate dwell time for the flocculation of the coagulant and impurities in the influent water. The weir serves to limit the flow of water from the flocculation tank to the flotation tank, until the water level in the flocculation tank exceed the height of the weir. The weir may be formed from the downstream wall of the flocculation tank, and, correspondingly, the upstream wall of the flotation tank. Prior to injection, influent/coagulant mixing system 5 draws and mixes a small amount of coagulant into the influent stream (coagulant concentration of 1-100 ppm is sufficient). The coagulant is stored in a small tank 17, and is mixed The flocculation tank measures about 5 feet wide, 9 feet long, and 7 feet deep, and holds about 1800 gallons when full.

The float is removed by the skimmer assembly 6. The skimmer assembly comprises a flight 19 which is driven across the surface of the water in the flotation tank by a flight drive mechanism 20. The flight extends transversely across the flotation tank, and preferably extends from sidewall to sidewall with little or no clearance. Conformable wipers or seals may be applied to the transverse ends of the skimmer to contact and wipe the sidewalls during skimmer translation to prevent retrograde flow of float. The flight may also be referred to as a skimmer. The drive mechanism may be a chain drive, worm gear, or any other suitable drive mechanism. Prior to movement of the flight, flow into and out of the system is adjusted to allow the flotation tank water level to rise above the level of the downstream wall of the flotation tank. The flight is moved slowly, at about 1.5 feet per minute (about 0.5 meters per minute) to push the float toward the downstream end of the flotation tank without causing significant turbulence in the flotation tank. The float is pushed over the end wall, and out of the tank. After the flight has skimmed the entire length of the flotation tank, it is driven further past the end of the tank, and is raised or tilted upward and washed. Also, the tank level is drawn down, below the level of the end wall. After washing, the flight is drawn back to the upstream end of the tank, where it is stored in anticipation of the next pass. During the skimmer pass, the water inflow, white water injection, and output continue.

The skimmer pushes the float over the end wall of the flotation tank. The float is pushed onto the beach 7 and waste transport system 8. The beach is provided in the form of a rolling conveyor belt. The belt continuously travels away from the flotation tank, and transports deposited float away from the tank. The float falls off the belt as the belt turns under rollers during its travel, and falls into a waste collector pan 21. The beach is rolled at a speed matching, or slightly exceeding, the horizontal speed of the flight. For example, belt speed may be 1.5 feet per minute to 2 feet per minute, and should be no less than 100% of belt speed, and is preferably about 105% to 120% of skimmer speed. By slightly exceeding the flight speed, the float is removed at a rate that prevents build-up on the belt (and potential retrograde flow back over the end wall into the flotation tank), while also avoiding turbulence in the flow. Float in the waste collector pan flows through waste line 22 to storage tanks or other systems for processing. The wastewater can be very fluid, though it contains up to 10% solids.

In the flocculation tank, the influent inlet 23 is positioned at the bottom of the tank, and the upstream end of the tank. Several baffles 24 are positioned to create the tortuous pathway desired to increase dwell time and encourage flocculation (the agglomeration of coagulant molecules and suspended solids). In the inlet piping, a coagulant supply tank and appropriate piping provided coagulant to the influent stream, and this is thoroughly mixed in the influent/coagulant mixing system 5. After mixing and flocculation in the flocculation tank, the flocculent-containing water flows over weir 11 into the flotation tank. The flotation tank contains an inflow baffle 25, which directs inflowing water downwardly, toward the aerated water (white water) inlet manifold 13. The mixed white water and flocculated influent flow upwardly through the bubble contact zone 27 established by the baffles 25 and 28, and then into the flotation zone 29. In the bubble zone, the dissolved air in the white water comes out of solution and forms micro-bubbles, and these micro-bubbles attach to the flocculent particles to form buoyant agglomerations of bubbles and flocculent particles. In the flotation zone, the bubble/flocculent agglomerations float to the surface of the water in the tank, and remain floating on the surface until skimmed from the tank by the flight. Clean water is removed from the bottom of the flotation tank. A small portion of the clean water may be diverted to the white water system, to be aerated and injected back into the flotation tank. The remainder of the clean water is pumped by pump 30 to filter tanks 9 and thereafter to disinfection system 31, after which it is considered potable water, and thereafter through potable water output line 32 into the municipal water supply or potable water supply. The filters may comprise filter tanks may comprise micro-filtration systems ultra-filtration systems, and the disinfection system may comprises an ultraviolet disinfection system or a chlorine injection system. The load on the disinfection system and filter tanks is greatly reduced by the removal of almost all the suspended solids in the influent water. The operation of the system, including monitoring of water chemistry, pump performance and flow measurements, periodic over-filling of the flotation tanks, and periodic translation of the flight, may be controlled from control mechanisms housed in the control room 10. The system is preferably automated and controlled by computer, requiring only routine monitoring by system operators and technicians.

All of the components are adapted for installation in a standard shipping container 39. The standard shipping container is preferably adapted for transport on rail cars, trucking platforms and container ships. The container is, thus, a standard size of 40 feet long, 8 feet wide, and 8 feet tall to match standard-sized shipping containers in use in the United States (the dimensions may be varied slightly while still maintaining the preferred compatibility with various trucking, rail, and shipping standards, and still be considered standard size). The shipping container is modified with the addition of closures necessary for access to the various subsystems of the purification system. The size may be adjusted to meet differing regional standards. All the components of the system fit within the container, so that the installation site need only supply electrical power and influent water, and replenishment of the consumables used in the process. Providing the system in the container allows the systems to be built in a central location, and thereafter be transported to any site for use. Multiple systems may be ganged together to meet any need, and thus may be purchased as needed by municipal water suppliers to meet the needs of growing communities. The systems may be shipped anywhere, and thus may be provided to remote locations quickly.

Figure 2:
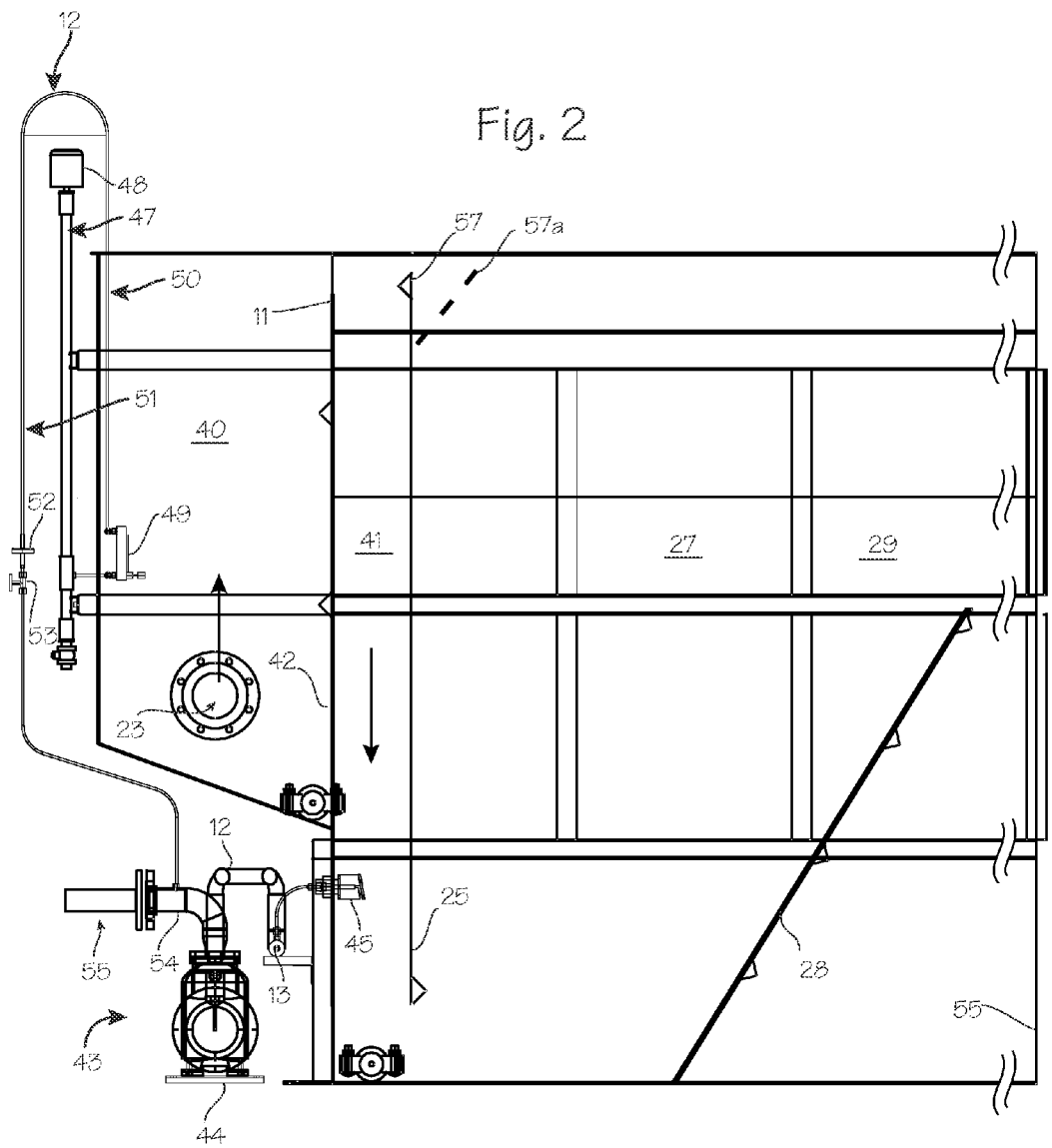
FIG. 2 is a side view of dissolved air flotation system showing details of the white water injection system.

FIG. 2 shows a side view of a new DAF system, with modifications which allow for separation of large bubbles which interfere with the DAF process. This system dispenses with the flocculant tank in favor of an inlet tank 40. The flotation tank 2, zone baffle 25, bubble zone 27, zone baffle 28, and flotation zone 29 are similar to the corresponding components shown in FIG. 1. Raw water enters the inlet tank 40 through influent supply inlet 23, which connects to an influent supply line (not shown), flows over the weir 11, and travels down the down-flow channel 41 established between the zone baffle 25 and the wall 42 of the flotation tank, and the travels upwardly into the bubble zone 27 established between the zone baffle 25 and the zone baffle 28. FIG. 2 shows details of an improved dissolved air supply system 43, including the DAF pump 44, the white water supply line 12, the manifold of injection ports 13 which supply white water to a number of nozzles 45. Air is supplied through the air intake line 46. The air intake line includes a first intake portion which extends upwardly like a snorkel (snorkel portion 47), and is fitted with an air filter 48, to minimize intake of dust and debris. Intake air travels down the snorkel, up through the rotameter and metering valve 49. (More sophisticated air flow meters may be used in place of the rotameter.) Air travels upwardly into and through the rotameter and metering valve 49, then up the ascending portion 50 of the air intake line, down the descending portion 51 and through the check valve 52 and shut-off valve 53 and the is drawn into the suction intake 54 of the DAF pump 44, along with clean water which is supplied through clean water supply line 55.

In this side view, the flotation tank end wall 56 is positioned about 14 feet (4.26 meters) from the wall 42. The weir 11, which as shown is the back wall of the floatation tank, has an upper edge which is about 6 feet (1.8 meters) from the bottom of the tank. The zone baffle 25, which together with the weir establishes the down-flow channel leading to the site of white water injection, extends upwardly, above the level of the weir, about 4 to 8 inches higher than the weir. Thus the upper extent 57 of the zone baffle is slight higher than the weir. The upper extent 57 of the zone baffle 25 can be angled toward the bubble zone 27, as shown at item 57a and away from the weir. This alteration of the zone baffle reduces disruption of any float formed above the down-flow channel during skimming operation as explained below.

Figure 3:
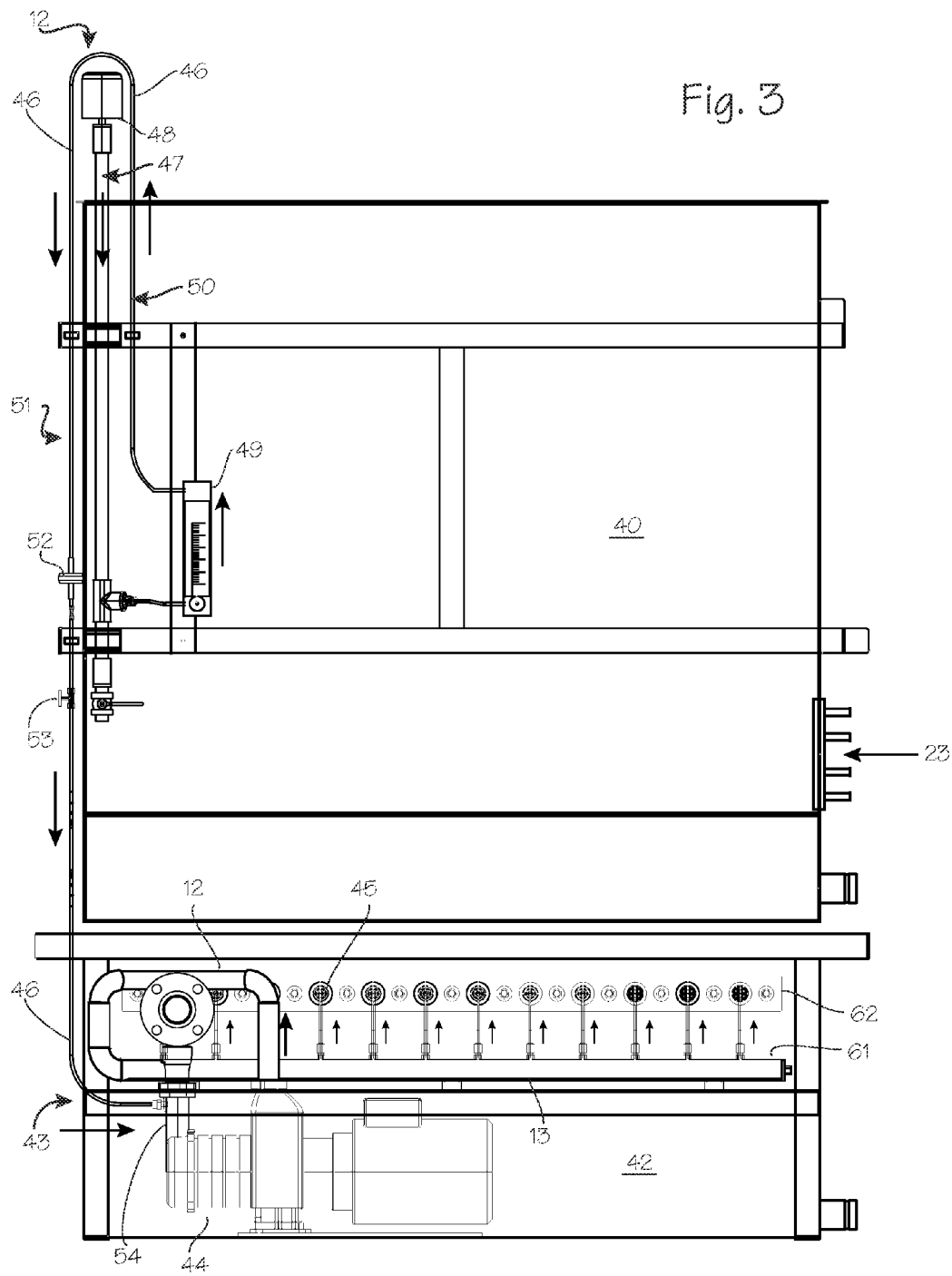
FIG. 3 is an end view of dissolved air flotation system of FIG. 2.

FIG. 3 is an end view of the system which shows air intake components described in FIG. 2, including the DAF pump 44, air intake line 46, check valve 52, shut-off valve 53 suction intake 54. As seen in this figure, the air intake line 46 is connected to the suction intake 54 of the DAF pump, so that air is drawn into the pump along with water. The air from the intake line is dissolved into water as the pump operates to pressurize the water for injection into the flotation tank. The pump thus creates the white water and pumps it into the white water supply line 12, through manifold portion 61, and into the white water injection nozzles 45. The injection nozzles may be fixed, as shown, in a mounting plate 62 which in turn is fixed to the wall of the flotation tank, over an aperture in the wall sized and dimensioned to accommodate the mounting plate. With this construction, the entire array of nozzles can be removed and replaced easily.

FIG. 4 is an overhead view of the white water system which shows the arrangement of the nozzles on the flocculation tank wall 42. The nozzles 45 are screwed into the mounting panel 62, which in turn is bolted to the wall 42, to position the nozzle outlets 63 on the inside of the tank. The flexible tubes 64 connect the nozzle inlets 65 to the white water manifold 61. White water passes through the nozzle outlets into the down-flow portion of the flotation tank. The arrangement of the nozzles and flexible tubes permits easy removal of the tubes for access to the bore of the nozzles for cleaning. The remainder of the components, including the DAF pump 44, DAF pump suction intake 54, air intake line 46, white water supply line 12 and the manifold portion 61 are as described in reference to FIGS. 2 and 3.

In operation, the system is operated to optimize the mix of bubble sizes passed from the down flow portion of the flotation tank into the bubble zone 27. Upon injection through the white water injection nozzles, the dissolved air in the white water comes out of solution and coalesces into bubbles of various sizes ranging from below 1 micron to 80 microns or more. Smaller bubbles, in the range of 1 to 10 microns, are better matched to the expected contaminant size, and more effectively bond to the contaminant particles. Larger bubbles are undesirable, because the ratio of charge versus surface are decreases with bubble size. The larger bubbles are more buoyant than the small bubbles, and thus can float upward against the current in the down-flow portion, if the down flow is provided at an appropriate rate. Thus, the size distribution of bubbles passed into the bubble chamber can be controlled by operating the system, including control of the down flow rate, down flow channel size, white water injection rate, and white water composition, and white water injection site. The modification of the various parameters allows the components to operate as a bubble separator which prevents large bubbles from flowing downwardly in the down-flow channel but instead allows them to float retrograde vis-à-vis the water flow. To accomplish this bubble separation method, to pass bubbles smaller than about 10 micron to pass under the zone baffle and allow bubbles larger than about 10 microns float upwardly in the down-flow channel, the system is configured and operated as follows:

The down-flow channel is established by the zone baffle in a flotation tank about 5 feet wide, six feet tall (as established by the weir), with the zone baffle spanning the width of the flotation tank and positioned about 8 inches from a wall of the tank, with the bottom of the zone baffle extended no lower than 8 inches (20 centimeters) above the bottom of the down-flow channel thus leaving a 8 inch (20 centimeter) passage between the floor and the zone baffle;

The white water is created with a ratio of 1 liter of air (at atmospheric pressure) to 37.855 liters of water (0.26 gallons of air to 10 gallons of water), and injected into the down-flow channel at a rate of 20 gallons (75.71 liters) per minute (28800 gallons (109020 liters) per day). The white water is injected through nozzles located 20 inches (51 centimeters) above the floor of the down-flow channel, with nozzles having a downwardly directed aperture. The and metering valve are set to provide 0.528 gallons per minute of air when the DAF pump is operated to provide 20.528 gallons per minute of white water to the flotation tank, to provide white water with an air content of 2 to 3% by volume;

The influent water is supplied at a rate of 300 gallons (1,136 liters) per minute (432,000 gallons (1,635,297.9 liters) per day). The down-flow velocity is about 12 feet/minute (0.2 feet/second, or 3.7 meters/minute). The influent water is supplied over the wall of the flotation tank, with initial downward velocity that is negligible;

The system is operated under ambient atmospheric pressure.

The parameters presented above provide a bubble separation system in which the white water is injected deep in the down-flow channel, as least three feet (one meter) below the inlet weir, but well above the bottom extent of the inlet zone baffle so that large bubbles cannot be washed under the zone baffle before they rise above the bottom extent of the inlet zone baffle. The specific parameters presented above can be generalized and modified, with the goal of injecting white water and providing influent water in a narrow down-flow channel, with the rate of flow of each fluid adjusted to permit retrograde flow of large bubbles but force small bubbles to flow with the influent water in the down-flow channel and thus into the bubble zone. Bubbles above 10 micron in size have a lift rate of about 7.5 feet per second (2.29 meters per second), so the down-flow velocity of 0.2 feet per second will not be sufficient to wash those bubbles under the zone baffle. Bubbles below 10 micron in size have lift rates below 7.5 feet per second, so a large portion of small bubbles are washed under the zone baffle and into the bubble chamber where they can fully interact with impurities in the influent water.

These parameters may be varied to accommodate different production rates. In a DAF system as described above operated to produce 432,000 gallons per day, the down-flow channel may be five feet wide and 9 inches deep, so that down-flow velocity is about 10.67 feet per minute (0.178 feet per second, or 5.4 cm per second). In this case, larger bubbles with a lift rate of above 10.67 feet per minute will rise in the down-flow channel, and only smaller bubbles will be washed under the zone baffle. Thus, bubbles of 10 microns or larger, which have an expected lift rate of 7.5 feet per second, will rise, and smaller bubble will be remain entrained in the downward flow and pass under zone baffle and into the bubble zone. Thus, the exact parameters may be varied while still achieving the goal of limiting the down-flow velocity to a velocity that allows large bubbles to rise against the down-flow within the down-flow channel, but is sufficiently fast to ensure that small bubbles are carried downwardly by the down-flow. Depending on the relative flow rates and lift rates, the parameters can be adjusted to allow smaller or larger bubbles to rise in the down-flow channel, so that only a specified range of bubble sizes will be passed under the zone baffle. Upon determination of a lift rate of, for example, 5 micron bubbles, the down-flow velocity can be slowed, so that only smaller bubbles are passed into the bubble zone.

As a result of allowing large bubbles to float upwardly in the down-flow channel, some of the large bubbles will bind with particles in the influent and carry those particles to the top of the down-flow channel. This creates a float at the top of the down flow channel, constituted by large bubbles and impurities. This float will be pushed over the top edge of the zone baffle 25. If the zone baffle is perfectly vertical, the rise of the float and flow over the top edge will result in acceleration of the float that disrupts the float. This will strip the bubbles from the particles, and may cause the particles to fall into the bubble zone where they will have to be bonded anew to bubbles in the bubble zone. To address this problem, a top portion 57 of the zone baffle is bent away from the wall 42, toward the bubble zone and in the direction of the float spillage into the bubble zone. This arrangement reduces the acceleration of the large bubble float over the baffle, so that the large bubble float remains intact after passage over the baffle, where it is removed with the main float by the skimmer as described above.

The computer, illustrated in FIG. 1, can be programmed to operate the various components of the system. With appropriate electro-mechanical actuators for the various valves and controllers for the DAF pump and influent pump, and optionally the rotameter and metering valve or remotely operable metering valve, the computer can be programmed to operate the various components to achieve the flow parameters described above.

While the inventive systems and methods have been described in relation to dissolved air flotation, it may be used for rudimentary air flotation systems (similar systems using macroscopic bubbles in the flotation tank) as well. Also, although described in relation to purifying fresh water influent for use in municipal water supplies, the beneficial aspects of the system may be employed in wastewater systems for a variety of industries. Furthermore, the elements of the various embodiments may be incorporated into each of the other species to obtain the benefits of those elements in combination with such other species, and the various beneficial features may be employed in embodiments alone or in combination with each other. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A method of operating a dissolved air flotation system for purifying influent water to promote bubble separation such that large bubbles are separated from the influent before the influent passes into a bubble chamber of the dissolved air flotation system, said method comprising:
   providing a dissolved air flotation system comprising:
      a flotation tank having an upstream end and a downstream end;
      an influent water supply in fluid communication with the upstream end of the flotation tank, a purified water outlet in fluid communication with the downstream end of the flotation tank, a first zone baffle vertically oriented within the flotation tank and spaced from a wall at the upstream end of the tank to define a down-flow channel spanning the width of the flotation tank between the wall and the zone baffle and defining a bubble zone in the remainder of the flotation tank, said down-flow channel being sized to provide down-flow a first downward velocity when the influent water is provided at a predetermined volumetric rate;
      a white water supply system comprising a DAF pump, a clean water supply line and an air intake line in fluid communication with an inlet to the DAF pump, and a white water outlet line in fluid communication with an outlet of the DAF pump, and at least one nozzle with an input in fluid communication with the white water outlet line and a nozzle outlet in fluid communication with the down-flow channel;
      wherein the nozzle outlets are disposed on the wall at the upstream end of the tank, close to the bottom of the down-flow channel;
   supplying influent water to the flotation tank such that it enters the down-flow channel, and supplying said influent water at the predetermined volumetric rate such that the downward velocity of the influent water within down-flow channel is lower than the lift rate of air bubbles of 10 microns or larger;
   injecting white water into a lower portion of the down-flow channel, and directing the white water downwardly in the down-flow channel;
   allowing air bubbles of 10 microns or larger to rise within the down-flow channel while influent water is flowing downwardly in the down-flow channel, and flushing air bubbles of less than 10 microns to be flushed under the zone baffle and into the bubble zone.

2. The method of claim 1 wherein the step of supplying influent water includes supplying influent water at a predetermined volumetric rate, relative to the down-flow channel dimensions, such that the down-flow velocity is less than about 10.67 feet per minute.

3. The method of claim 1 wherein:
   the step of supplying influent water includes supplying influent water at a predetermined volumetric rate of 300 gallons per minute;
   the down-flow channel is established by the zone baffle in a flotation tank about 5 feet wide, six feet tall, with the zone baffle spanning the width of the flotation tank and positioned about 8 inches from the upstream wall of the tank, with the bottom of the zone baffle extended no lower than 8 inches above the bottom of the down-flow channel, thus leaving a 8 inch (20 centimeter) passage between the floor and the zone baffle;

white water is created with a ratio of 1 liter of air to 37.855 liters of water, and injected into the down-flow channel at a rate of 20 gallons (75.71 liters) per minute.

4. A dissolved air flotation system for purifying influent water, where said influent water is provided at a predetermined volumetric rate, said system comprising:

a flotation tank having an upstream end and a downstream end;

an influent water supply in fluid communication with the upstream end of the flotation tank, a purified water outlet in fluid communication with the downstream end of the flotation tank, a zone baffle vertically oriented within the flotation tank and spaced from a wall at the upstream end of the tank to define a down-flow channel spanning the width of the flotation tank, said down-flow channel being sized to provide down-flow a first downward velocity when the influent water is provided at the predetermined volumetric rate;

a white water supply system comprising a DAF pump, a clean water supply line and an air intake line in fluid communication with an inlet to the DAF pump, and a white water outlet line in fluid communication with an outlet of the DAF pump, and at least one nozzle with an input in fluid communication with the white water outlet line and a nozzle outlet in fluid communication with the down-flow channel;

wherein the nozzle outlets are disposed on the wall at the upstream end of the tank, close to the bottom of the down-flow channel;

wherein the first downward velocity in the down-flow channel is lower than the lift rate of air bubbles of 10 microns or larger.

* * * * *